April 14, 1942.  M. C. WHITE ET AL  2,279,607

FLUID METER

Filed Oct. 9, 1939

INVENTORS.
MORRIS C. WHITE
FRANK C. SUTLIFFE
ROY ASHLEY
BY Lippincott & Metcalf
THEIR ATTORNEYS.

Patented Apr. 14, 1942

2,279,607

UNITED STATES PATENT OFFICE 2,279,607

FLUID METER

Morris C. White, San Francisco, Frank C. Sutliffe, Mill Valley, and Roy Ashley, Almonte, Calif.; said Sutliffe and said Ashley assignors to said White Application October 9, 1939, Serial No. 298,530

5 Claims. (Cl. 73—228)

This invention relates to fluid gauges and particularly to gauges of the "bridled turbine" type, wherein a jet connected with the source of fluid to be measured is directed against a rotor which is resiliently controlled.

Among the objects of this invention are: To provide a meter of the type described having a scale which is linear with respect to fluid pressure; to provide a meter of increased operative torque; to provide a meter whose calibration is capable of adjustment over a substantial range; and to provide a meter which can be cheaply made and rapidly adjusted to the desired calibration.

Other objects of our invention will be apparent or will be specifically pointed out in the description forming a part of this specification, but we do not limit ourselves to the embodiment of the invention herein described, as various forms may be adopted within the scope of the claims.

Referring to the drawing: Figure 1 is a plan view of one embodiment of the invention, comprising the movement of a meter of the class described. The case is omitted for the sake of simplicity.

Figure 1:
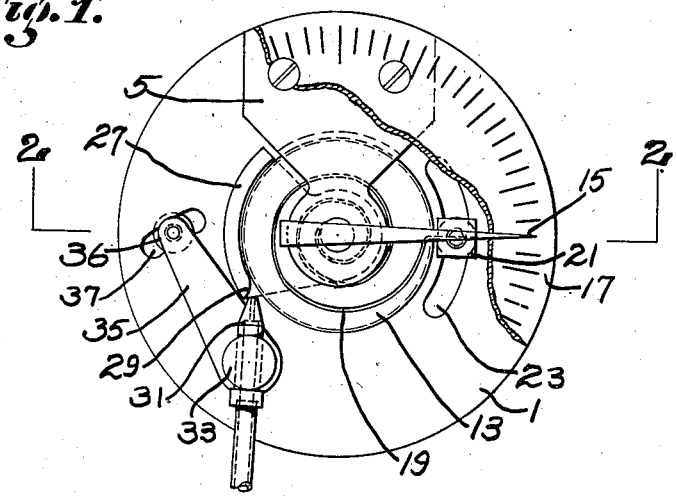

Pressure gauges or meters of the bridled turbine type may be made to be extremely sensitive and to have a very high degree of accuracy. With such meters the scale is usually quite nearly linear over the major portion of its range, but it is very likely to be non-linear at the limits of that range, particularly toward the zero end of the scale. From a production point of view, it is extremely valuable to have the scale linear and to have it maintain its linearity through wide pressure variations so that the same meter movement, with the exception of the controlling spring, may be used for meters of widely different ranges.

Where meters of the type described are used as pressure gauges, it is desirable that the leak caused by the jet should be as small as possible and hence the jet is preferably made with a very fine orifice, usually of the order of ten one-thousandths of an inch in diameter. In order to avoid the necessity of hand calibration the small jet orifice in successive meters must be held within extremely narrow limits, and the difficulty of maintaining these limits increases with the length of the fine diameter passage.

It has been found in practice that with passages of such length as may readily be maintained within the required limits of accuracy, the full contraction and maximum velocity of the jet are not attained exactly at the orifice but some distance therefrom, and the distance at which maximum velocity is reached appears to be a function of the pressure. A possible explanation of the anomalies which have been observed in the meter scales is that the position of maximum velocity, for low pressures, may be within the point of tangency of the jet and rotor, whereas for high pressures maximum velocity may not be reached until the jet has passed completely beyond its point of contact with the rotor surface. Experimental data appear to support this explanation, but we do not wish to be bound by this theory as to the causes of the effects observed. Our invention relates to an apparatus for overcoming these effects whatever may be their cause.

Considered broadly, our invention comprises the provision of a Venturi throat into which the jet discharges, thereby drawing into the emergent fluid secondary fluid which unites with the initial flow to provide a jet of larger volume but lower velocity, directed against the rotor to provide the torque to be measured. It would normally appear, since the pressure of a jet is proportional to its density multiplied by the square of its velocity, that the introduction of secondary fluid, with its consequent decrease in velocity, would decrease the torque and result in less stable readings, but we have found in practice that more of the energy of the jet is transferred to the rotor under the conditions mentioned and that the anomalies or non-linearities in the scale, as described above, may be made entirely negligible. This is possible with a single Venturi jet but the effect, particularly as regards increase in torque, may be made more apparent by conforming a shroud or guard to the periphery of the rotor, shaping the end of the shroud to form the Venturi throat, and directing the simple jet into this throat. With the shroud pivotally mounted coaxially with the rotor it may be adjusted with relation to the orifice to vary the secondary fluid injected, thus affording a valuable means of calibration.

To illustrate the preferred form of the invention, we have chosen an air pressure gauge which comprises a die-cast base plate 1, formed integrally with a post 3 and carrying a bridge 5 which extends over the center of the circular base plate.

Mounted in the center of the base plate is a screw 7 which carries a pivot jewel (not shown), and a similar screw mounted jewel 9 is carried by the bridge. A staff 11 is pivoted between the jewels and on this staff are mounted the aluminum rotor 13 and a hand 15. A dial 17 is secured to the bridge, and the hand extends laterally from its point of mounting, immediately above the rotor, and thence upwardly through a slot in the dial, and returning past its center of support to form the meter index. The control or bridle of the rotor is a hair spring 19 which is anchored to an abutment 21, the latter being movable in an arcuate slot 23 to provide a zero adjustment for the hand.

The rotor 13 is in the form of a shallow cylindrical drum, having an arcuate groove around its periphery. This groove serves two purposes. First, it forms an air channel and second, its form lends itself to the formation of serrations, or teeth, around the rotor-rim by the hobbing process, and we have found that this process gives extremely accurate and uniform teeth, this being an important factor in securing consistent operating characteristics. It should be noted, however, that it is not essential that the rotor be toothed, for satisfactory torque may be obtained with a simple polished surface on the drum. In general, however, the untoothed drum will not give a linear pressure scale, although the scale obtained may be linear for other desirable functions of flow or pressure.

Mounted coaxially with the drum, on the jewel screw 7, is a sector comprising a transverse portion 25 and a cylindrical rim or shrouding 27, the rim being conformed as closely as possible to the circumference of the drum. In practice the clearance between drum and shrouding sector is of the order of .001 inch.

It should be noted in passing, however, that both the grooving of the rotor and the extremely close approximation of the shrouding sector are not essential features, since fairly satisfactory results have been obtained with straight sided drums and shrouding sectors spaced .020 inch or more from the drum. One end of the cylindrical sector is tapered or cut away as is shown at 29 to form the throat of a venturi. The jet 31 is directed into this throat and the shrouding cooperates with the channel or groove in the circumference of the rotor to direct both the primary jet and the secondary air which it aspirates around the drum, holding it in contact therewith until it has parted with its energy. We have found that the shrouding should preferably subtend a material arc around the rotor, and that, up to a certain point, the torque increases with the arc subtended. If, however, the arc is too long in proportion to the cross-sectional area of the channel formed between drum and shrouding, the torque decreases again, apparently owing to the back pressure set up which prevents satisfactory aspiration of the secondary air.

The meter is provided with two means of adjustment for calibration purposes, aside from the zero adjustment already described. The first of these comprises means for varying the angle at which the jet impinges upon the rotor. The jet is mounted in a post 33 to which is secured a lever 35, which rotates the post upon its vertical axis until the correct angle is obtained. A locking screw 36, operating in a curved slot 37, permits the jet to be anchored at the correct angle when once this has been ascertained.

The second adjustment is obtained by rotating the shrouding 27 around its center support, thus varying the approximation of the jet orifice into the Venturi throat. In general, the lower the pressure for which the device is constructed the closer should be this approximation. The correct relationship for linear scale may quickly be found by trial and error and depends in some degree upon the contour and dimensions of the channel as well as the pressure. Once found for a given design and scale range, all meters of the same general characteristics will be found to require closely similar settings. Hair spring variations may be compensated by adjusting the angle of the jet by means of the lever and lock screw.

Figure 2:
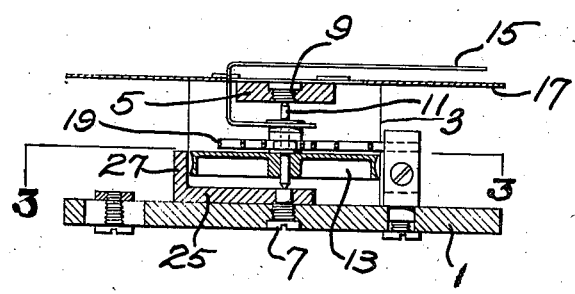
Figure 2 is a diametrical section of the device shown in Figure 1, the plane of projection being indicated by the line 2—2 of the first figure.
Figure 3:
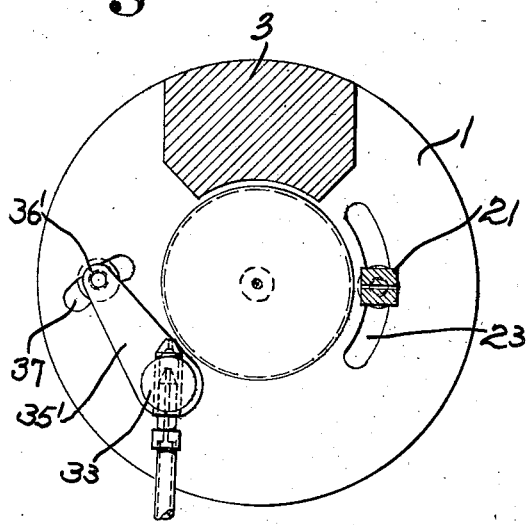
Figure 3 is a view partly in plan and partly in section of a meter similar to that shown in Figure 1 embodying a modified form of the invention.
Figure 4:
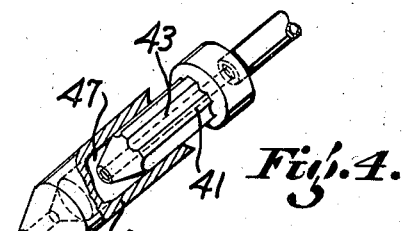
Figure 4 is an enlarged detail, partly in section, showing in perspective, the nozzle or jet used in the form of the device shown in Figure 3.

A less flexible modification of our invention is shown in Figures 3 and 4. In this modification the frame and bridge structure, together with the hand, dial and hairspring, are the same as in the meter of Figures 1 and 2 and hence are omitted from the drawing. In this case the primary jet and venturi are combined, the jet 41 having a body provided with external flutes 43. A cap 45 is fitted over the jet and is provided with a taper bore 47 terminating in a secondary channel or orifice 49. The amount of secondary air drawn in by the jet may be adjusted by sliding the cap 45 in or out over the fluted body of the primary jet. The angle of the jet with relation to the rotor is adjusted by the lever arm 35' and lockscrew 36' as in the case of the meter already described. This form of the device is highly effective in the upper ranges of the scale and in meters for high pressure use, but does not carry the linear portion of the scale down to as low a range as does the form first described. This, however, may be an advantage where the working range of the meter starts at some fixed value which is definitely above zero and it is desired to compress the lower portion of the scale to spread out the working range as far as possible.

We claim:

1. In a fluid gauge of the bridled turbine type, comprising a spring controlled rotor, the combination with said rotor of a jet for connection to the fluid source to be measured, a Venturi throat cooperating with said jet to introduce secondary fluid into the flow therefrom, and means for directing said flow against said rotor to cause a turning moment thereof.

2. In a fluid gauge of the bridled turbine type, comprising a spring controlled rotor, the combination with said rotor of a jet for connection to the fluid source to be measured, a Venturi throat cooperating with said jet to introduce secondary fluid into the flow therefrom, means for directing said flow against said rotor to cause a turning moment thereof, and means for adjusting the proportion of secondary fluid introduced into said flow.

3. In a fluid gauge of the bridled turbine type, comprising a spring controlled rotor, the combination with said rotor of a jet for connection to the fluid source to be measured, a Venturi throat cooperating with said jet to introduce secondary fluid into the flow therefrom, means for directing said flow against said rotor to cause a turning moment thereof, and means for maintaining said flow in contact with the periphery of said rotor over a predetermined arc.

4. In a fluid gauge of the bridled turbine type, comprising a spring controlled rotor, the combination with said rotor of a jet for connection to the fluid source to be measured, and a shrouding conformed to the periphery of said rotor and partially surrounding the same, one end of said shrouding being relieved to form an open Venturi throat and said jet being directed into the opening of said throat.

5. In a fluid gauge of the bridled turbine type, comprising a spring controlled rotor, the combination with said rotor of a jet for connection to the fluid source to be measured, a shrouding conformed to the periphery of said rotor and partially surrounding the same, one end of said shrouding being relieved to form an open Venturi throat and said jet being directed into the opening of said throat, and means for adjusting the spacing between the jet orifice and said throat.

MORRIS C. WHITE.
FRANK C. SUTLIFFE.
ROY ASHLEY.